United States Patent
Chorian et al.

(10) Patent No.: US 9,318,751 B2
(45) Date of Patent: Apr. 19, 2016

(54) TRACTION BATTERY ASSEMBLY WITH SPRING COMPONENT

(71) Applicant: Ford Global Technologies, LLC, Dearborn, MI (US)

(72) Inventors: Steven F. Chorian, Canton, MI (US); Patrick Daniel Maguire, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 110 days.

(21) Appl. No.: 14/230,453

(22) Filed: Mar. 31, 2014

(65) Prior Publication Data
US 2015/0280291 A1   Oct. 1, 2015

(51) Int. Cl.
| H01M 2/00 | (2006.01) |
|---|---|
| H01M 2/10 | (2006.01) |
| H01M 10/04 | (2006.01) |
| H01M 6/50 | (2006.01) |
| H01M 10/6556 | (2014.01) |

(52) U.S. Cl.
CPC ............. *H01M 6/5038* (2013.01); *H01M 2/00* (2013.01); *H01M 10/5057* (2013.01)

(58) Field of Classification Search
None
See application file for complete search history.

(56) References Cited

U.S. PATENT DOCUMENTS

| 5,521,021 | A  | * | 5/1996 | Alexandres | H01M 2/0202 429/174 |
|---|---|---|---|---|---|
| 6,829,142 | B2 |   | 12/2004 | Belady et al. | |
| 8,308,111 | B2 |   | 11/2012 | Lu et al. | |
| 2003/0162091 | A1 | * | 8/2003 | Watanabe | H01M 2/0262 429/156 |
| 2009/0098432 | A1 | * | 4/2009 | Rosenberg | F28F 13/12 429/444 |
| 2010/0273041 | A1 | * | 10/2010 | Lawall | H01M 2/1072 429/120 |
| 2012/0301772 | A1 | * | 11/2012 | Hirsch | H01M 10/0481 429/120 |
| 2013/0009464 | A1 |   | 1/2013 | Firehammer et al. | |
| 2013/0071707 | A1 | * | 3/2013 | Koester | H01M 10/656 429/72 |

* cited by examiner

*Primary Examiner* — Patrick Ryan
*Assistant Examiner* — Jose Colucci Rios
(74) *Attorney, Agent, or Firm* — David B. Kelley; Brooks Kushman P.C.

(57) ABSTRACT

A traction battery thermal plate assembly may include a structure having edge portions defining a cavity and configured to support a battery cell array, a thermal plate disposed within the cavity and adjacent to the array, and a spring assembly disposed within the cavity between the structure and the plate. The spring assembly may be configured to exert a force against the plate such that plate contacts the array to transfer heat between the array and the plate. The thermal plate disposed within the cavity may be below the array. The spring assembly may include a body defining a plurality of tabs configured to extend outward from a plane defined by the body. The spring assembly may include a base portion and an upper portion configured to support one or more compression springs therebetween.

18 Claims, 4 Drawing Sheets

TRACTION BATTERY ASSEMBLY WITH SPRING COMPONENT

TECHNICAL FIELD

This disclosure relates to thermal management systems for high voltage batteries utilized in vehicles.

BACKGROUND

Vehicles such as battery-electric vehicles (BEVs), plug-in hybrid-electric vehicles (PHEVs), mild hybrid-electric vehicles (MHEVs), or full hybrid-electric vehicles (FHEVs) contain a traction battery, such as a high voltage (HV) battery, to act as a propulsion source for the vehicle. The HV battery may include components and systems to assist in managing vehicle performance and operations. The HV battery may include one or more arrays of battery cells interconnected electrically between battery cell terminals and interconnector busbars. The HV battery and surrounding environment may include a thermal management system to assist in managing temperature of the HV battery components, systems, and individual battery cells.

SUMMARY

A traction battery thermal plate assembly includes a structure having edge portions defining a cavity and configured to support a battery cell array, a thermal plate disposed within the cavity and adjacent to the array, and a spring assembly disposed within the cavity between the structure and the plate. The spring assembly is configured to exert a force against the plate such that plate contacts the array to transfer heat between the array and the plate. The thermal plate disposed within the cavity may be below the array. The spring assembly may include a body defining a plurality of tabs configured to extend outward from a plane defined by the body. The spring assembly may include a crimped sheet of material defining a plurality of tabs extending above and below a plane defined by the body in a wave like fashion. The spring assembly may include a base portion and an upper portion configured to support one or more compression springs therebetween. The spring assembly may be configured to exert a force toward the thermal plate greater than a weight of the thermal plate. The structure may further define a pair of retainer segments extending below a portion of a bottom surface of the battery cell array such that the retainer segments receive a load of the battery cell array.

A vehicle includes a battery array defining at least one surface, a structure located proximate to the array such that the array and structure define a cavity adjacent to the array, a thermal plate configured for thermal communication with the array and extending throughout the cavity and along the surface, and a spring component configured to exert an upward force on the thermal plate such that the thermal plate contacts the at least one surface. The at least one surface may be a bottom surface of the battery cell array and the structure may be a support structure including a pair of retainer segments extending below a portion of the bottom surface such that the retainer segments receive a load of the array. The thermal plate extending throughout the cavity may be below the array. The spring component may include a body defining a plurality of tabs extending outward from a plane defined by the body and configured to exert a force equal to or greater than a weight of the thermal plate. The spring component may include a crimped sheet of material defining tabs extending upward and downward in a wave like fashion and the tabs may be configured to exert a force against the thermal plate. The spring component may include a base portion and an upper portion configured to support a plurality of compression springs therebetween, and the compression springs may be configured to exert a force equal to or greater than a weight of the thermal plate. The spring component may be configured to exert a force against the thermal plate greater than a force generated by a weight of the thermal plate. The spring component may be configured to exert a force against the thermal plate equal to a force generated by a weight of the thermal plate and a weight of the array.

A traction battery assembly includes a battery cell array defining a bottom surface, a support structure, a thermal plate and a spring component. The support structure includes one or more retainer segments configured to receive a load generated by the array and edge portions arranged with the array such that the array and support structure define a cavity therebetween. The thermal plate is disposed within the cavity and defines channels therein configured to direct thermal fluid therethrough. The spring component is disposed within the cavity below the thermal plate and configured to apply a force to the thermal plate such that the thermal plate contacts the bottom surface to promote heat transfer. The spring component may include a body defining a plurality of tabs extending upward of a plane defined by the body and configured to exert a force equal to or greater than a weight of the thermal plate. The spring component may include a body defining tabs extending upward and downward in a wave like fashion and the tabs may be configured to exert a force against the thermal plate. The spring component may include a base portion and an upper portion configured to support a plurality of compression springs therebetween, and the compression springs may be configured to exert a force equal to or greater than a weight of the thermal plate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
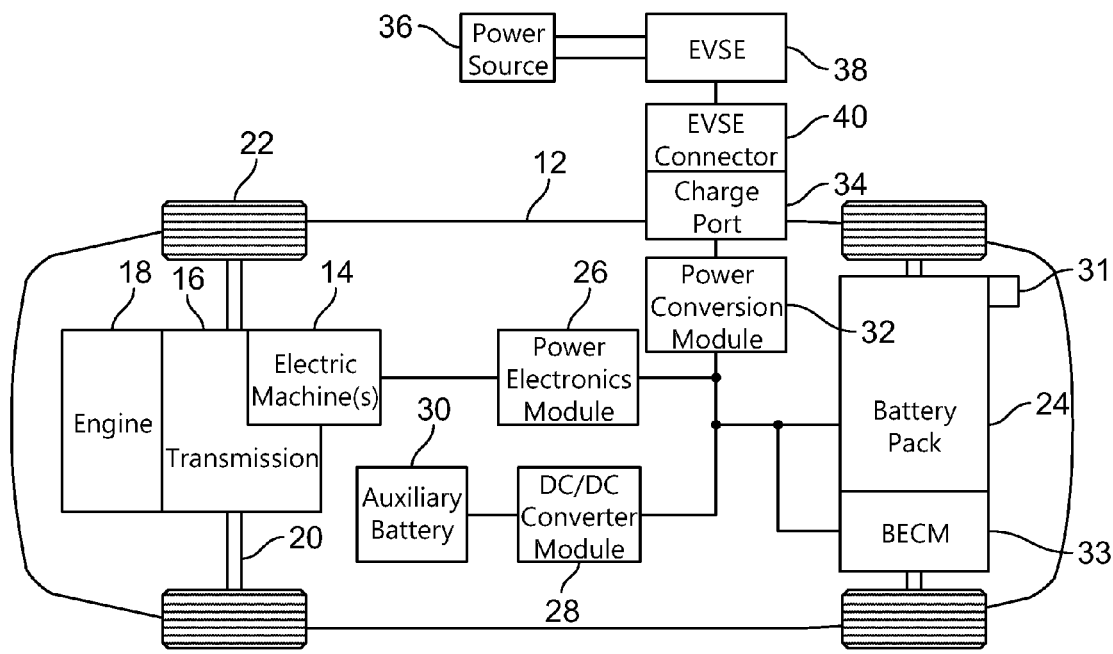
FIG. 1 is a schematic illustration of a battery electric vehicle.

FIG. 1 depicts a schematic of a typical plug-in hybrid-electric vehicle (PHEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode or hybrid mode under certain conditions to reduce overall fuel consumption of the vehicle 12.

A traction battery or battery pack 24 stores and provides energy that can be used by the electric machines 14. The traction battery 24 typically provides a high voltage DC output from one or more battery cell arrays, sometimes referred to as battery cell stacks, within the traction battery 24. The battery cell arrays may include one or more battery cells. The traction battery 24 is electrically connected to one or more power electronics modules 26 through one or more contactors (not shown). The one or more contactors isolate the traction battery 24 from other components when opened and connect the traction battery 24 to other components when closed. The power electronics module 26 is also electrically connected to the electric machines 14 and provides the ability to bi-directionally transfer electrical energy between the traction battery 24 and the electric machines 14. For example, a typical traction battery 24 may provide a DC voltage while the electric machines 14 may require a three-phase AC voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary battery 30 (e.g., 12V battery).

A battery electrical control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24. The temperature sensor 31 may also be located on or near the battery cells within the traction battery 24. It is also contemplated that more than one temperature sensor 31 may be used to monitor temperature of the battery cells.

The vehicle 12 may be, for example, an electric vehicle such as a PHEV, a FHEV, a MHEV, or a BEV in which the traction battery 24 may be recharged by an external power source 36. The external power source 36 may be a connection to an electrical outlet. The external power source 36 may be electrically connected to electric vehicle supply equipment (EVSE) 38. The EVSE 38 may provide circuitry and controls to regulate and manage the transfer of electrical energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus (e.g., Controller Area Network (CAN)) or via discrete conductors.

The battery cells, such as a prismatic cell, may include electrochemical cells that convert stored chemical energy to electrical energy. Prismatic cells may include a housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another and a busbar may assist in facilitating a series connection between the multiple battery cells. The battery cells may also be arranged in parallel such that similar terminals (positive and positive or negative and negative) are adjacent to one another. For example, two battery cells may be arranged with positive terminals adjacent to one another, and the next two cells may be arranged with negative terminals adjacent to one another. In this example, the busbar may contact terminals of all four cells.

The traction battery 24 may be heated and/or cooled using a liquid thermal management system, an air thermal management system, or other method as known in the art. In one example of a liquid thermal management system and now referring to FIG. 2, the traction battery 24 may include a battery cell array 88 shown supported by a thermal plate 90 to be heated and/or cooled by a thermal management system. The battery cell array 88 may include a plurality of battery cells 92 positioned adjacent to one another and structural components. The DC/DC converter module 28 and/or the BECM 33 may also require cooling and/or heating under certain operating conditions. A thermal plate 91 may support the DC/DC converter module 28 and BECM 33 and assist in thermal management thereof. For example, the DC/DC converter module 28 may generate heat during voltage conversion which may need to be dissipated. Alternatively, thermal plates 90 and 91 may be in fluid communication with one another to share a common fluid inlet port and common outlet port.

In one example, the battery cell array 88 may be mounted to the thermal plate 90 such that only one surface, of each of the battery cells 92, such as a bottom surface, is in contact with the thermal plate 90. The thermal plate 90 and individual battery cells 92 may transfer heat between one another to assist in managing the thermal conditioning of the battery cells 92 within the battery cell array 88 during vehicle operations. Uniform thermal fluid distribution and high heat transfer capability are two thermal plate 90 considerations for providing effective thermal management of the battery cells 92 within the battery cell arrays 88 and other surrounding components. Since heat transfers between thermal plate 90 and thermal fluid via conduction and convection, the surface area in a thermal fluid flow field is important for effective heat transfer, both for removing heat and for heating the battery cells 92 at cold temperatures. For example, charging and discharging the battery cells generates heat which may negatively impact performance and life of the battery cell array 88 if not removed. Alternatively, the thermal plate 90 may also provide heat to the battery cell array 88 when subjected to cold temperatures.

Figure 2:
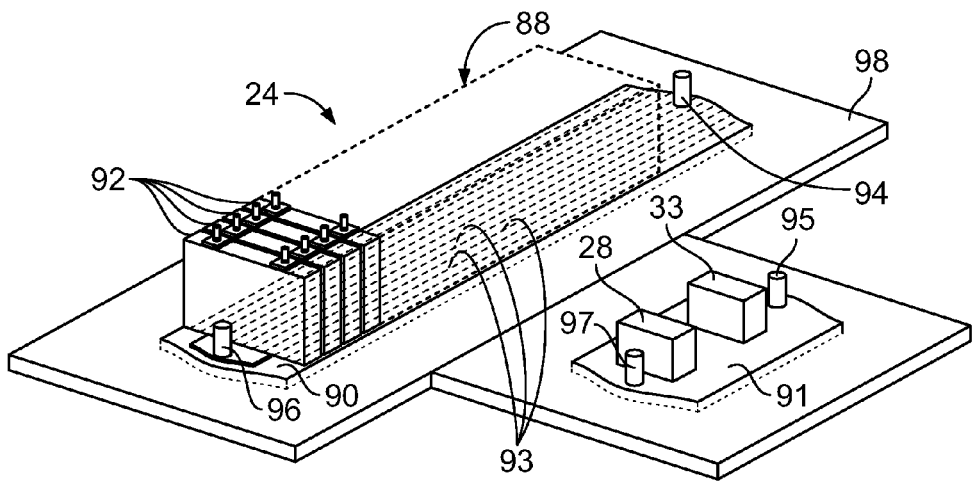
FIG. 2 is a perspective view of a portion of a thermal management system for the traction battery of the vehicle in FIG. 1.

The thermal plate 90 may include one or more channels 93 and/or a cavity to distribute thermal fluid through the thermal plate 90. For example, the thermal plate 90 may include an inlet port 94 and an outlet port 96 that may be in communication with the channels 93 for providing and circulating the thermal fluid. Positioning of the inlet port 94 and outlet port 96 relative to the battery cell arrays 88 may vary. For example and as shown in FIG. 2, the inlet port 94 and outlet port 96 may be centrally positioned relative to the battery cell arrays 88. The inlet port 94 and outlet port 96 may also be positioned to the side of the battery cell arrays 88. Alternatively, the thermal plate 90 may define a cavity (not shown) in communication with the inlet port 94 and outlet port 96 for providing and circulating the thermal fluid. The thermal plate 91 may include an inlet port 95 and an outlet port 97 to deliver and remove thermal fluid. Optionally, a sheet of thermal interface material (not shown) may be applied to the thermal plate 90 and/or 91 below the battery cell array 88 and/or the DC/DC converter module 28 and BECM 33, respectively. The sheet of thermal interface material may enhance heat transfer between the battery cell array 88 and the thermal plate 90 by filling, for example, voids and/or air gaps between the battery cells 92 and the thermal plate 90. The thermal interface material may also provide electrical insulation between the battery cell array 88 and the thermal plate 90. A battery tray 98 may support the thermal plate 90, the thermal plate 91, the battery cell array 88, and other components. The battery tray 98 may include one or more recesses to receive thermal plates.

Different battery pack configurations may be available to address individual vehicle variables including packaging constraints and power requirements. The battery cell array 88 may be contained within a cover or housing (not shown) to protect and enclose the battery cell array 88 and other surrounding components, such as the DC/DC converter module 28 and the BECM 33. The battery cell array 88 may be positioned at several different locations including below a front seat, below a rear seat, or behind the rear seat of the vehicle, for example. However, it is contemplated the battery cell arrays 88 may be positioned at any suitable location in the vehicle 12.

A contact of the mating surfaces between a thermal plate and surfaces of the battery cells is a factor which may affect heat transfer within a battery thermal management system, and particularly with regard to conduction between the thermal plate and the battery cells. The mating surfaces may be uneven due to surface tolerances, component irregularities, and/or debris which may result in gaps therebetween. Additionally, deformation of the battery cell array, such as bending and/or twisting, may result in battery cell to battery cell placement tolerances. Heat transfer relating to battery cell cooling may be less efficient where gaps are present between the mating surfaces of the respective thermal plates and bottom surfaces of the battery cells. Some thermal management systems may use a thermal interface layer to assist in filling gaps, however a thermal interface layer may not be able to compensate for certain contact deficiencies. Eliminating these contact deficiencies and/or obtaining a flush contact between the surfaces may be desirable to provide for more enhanced heat transfer within the thermal management system. Additionally, certain thermal management systems include the thermal plate as part of a structure supporting the battery cell array. This integration may require the thermal plate to be designed to receive the weight and structural loads of the battery cell array which may add to cost and production time. The weight and/or structural loads of the battery cell array may also create a moment on certain portions of the thermal plate.

Figure 3:
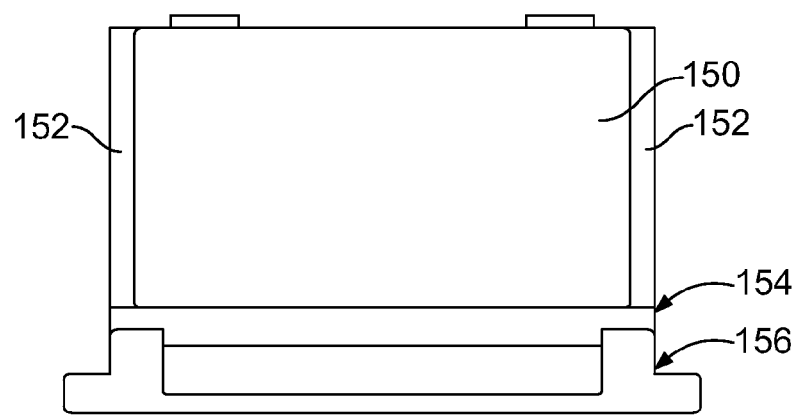
FIG. 3 is a front view, in cross-section, of a portion of a traction battery assembly including a battery cell array, an array support structure, a thermal plate, and a base support structure.

FIG. 3 shows an example of a portion of a traction battery assembly including a battery cell array 150 housed within an array structure 152. A thermal plate 154 is located below the battery cell array 150 and the array structure 152 such that the thermal plate 154 supports the battery cell array 150 and the array structure 152. A base support structure 156 supports the thermal plate 154, the battery cell array 150, and the array structure 152. In this example, the thermal plate 154 receives a load of the battery cell array 150 and the array structure 152 which also may create a moment on the thermal plate 154. Further, the thermal plate 154 is static and may not be able to adjust to certain mating surface contact deficiencies between the thermal plate 154 and the battery cell array 150.

Figure 4A:
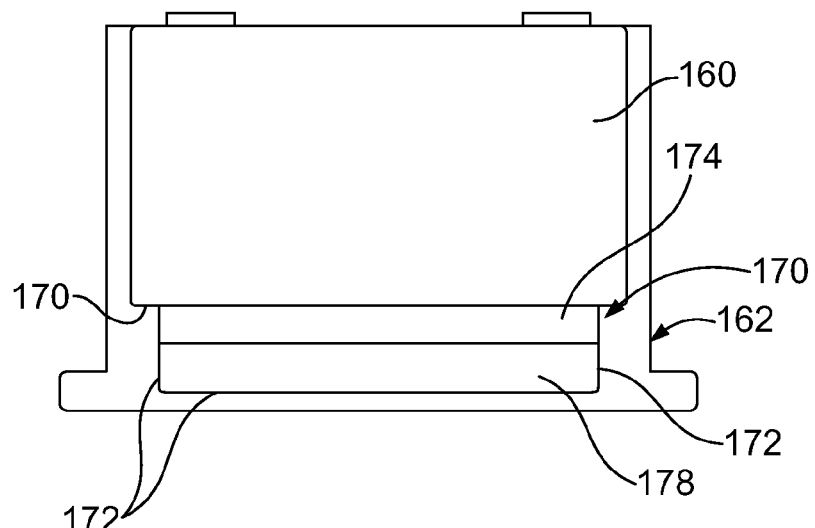
FIG. 4A is a front view, in cross-section, of a portion of a traction battery assembly including a battery cell array, a thermal plate, a spring component, and a battery cell array support structure.
Figure 4B:
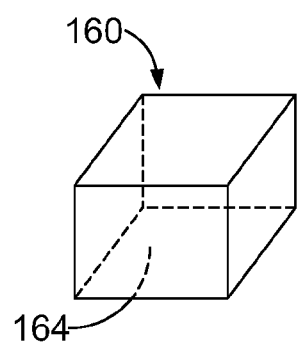
FIG. 4B is a perspective view of the battery cell array from FIG. 4A.

FIG. 4A shows another example of a portion of a traction battery assembly including a battery cell array 160 housed within a support structure 162. The battery cell array 160 may define one or more surfaces, such as a bottom surface 164 as shown in FIG. 4B. The support structure 162 may include and/or define retainer segments 170 extending below a portion of the bottom surface 164 such that the retainer segments 170 receive a load of the battery cell array 160. The support structure 162 is arranged with the battery cell array 160 such that a cavity is defined therebetween. In one example, edge portions 172 of the support structure 162 may be arranged with the battery cell array 160 to define the cavity therebetween. A thermal plate 174 may be disposed within the cavity and adjacent to the battery cell array 160. The thermal plate 174 may define one or more channels (not shown) therein which may be configured to direct thermal fluid flow therethrough. The thermal plate 174 may be configured to thermally communicate with the battery cell array 160 and may extend throughout the cavity and along the bottom surface 164 of the battery cell array 160. A spring component 178 may be disposed within the cavity between the edge portions 172 of the support structure 162 and the thermal plate 174. The spring component 178 may be configured to exert a force against the thermal plate 174 such that the thermal plate 174 contacts the battery cell array 160. This contact may assist in transferring heat between the battery cell array 160, the thermal plate 174, and thermal fluid flowing within the thermal plate 174. For example, the spring component 178 may be a spring assembly including a mechanical energy storage device such as one or more compression springs, flexible tabs, or a crimped sheet of material.

Figure 5A:
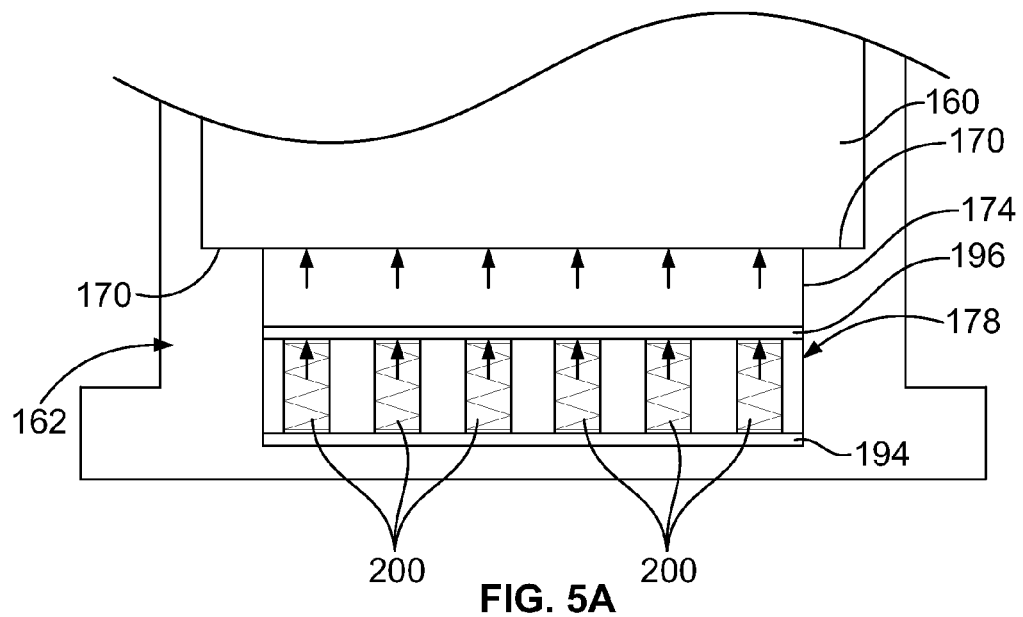
FIG. 5A is a front view, in cross-section, of a battery cell array, a thermal plate, a spring component, and a battery cell array support structure.
Figure 5B:
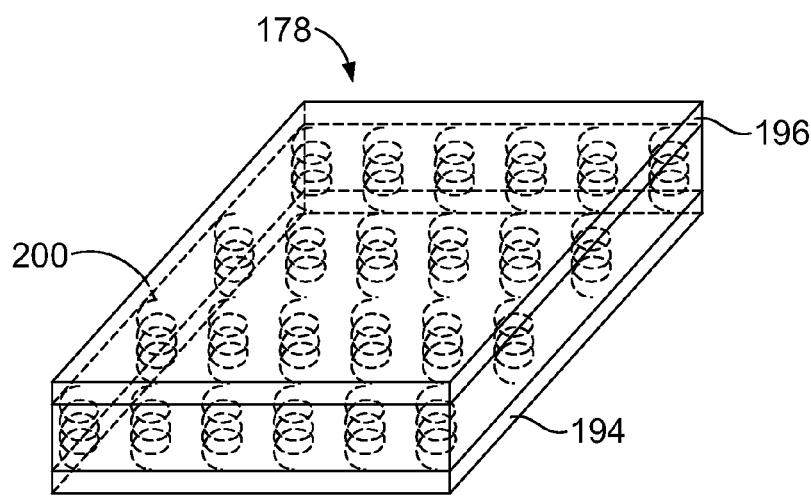
FIG. 5B is a perspective view of the spring component from FIG. 5A.

FIGS. 5A and 5B show an example of the spring component 178 which may include a base portion 194 and an upper portion 196 which may be configured to support one or more compression springs 200 therebetween. The compression springs 200 may be secured to the base portion 194 and the upper portion 196. The compression springs 200 may be spaced apart throughout the spring component 178 and/or may be tightly spaced throughout the spring component 178. It is contemplated that multiple arrangements of the compression springs 200 are available which may accommodate, for example, different traction battery packaging constraints and different load requirements for different types of battery cell arrays. In this example, the one or more compression springs 200 may be configured to exert a force against the thermal plate 174 such that the thermal plate 174 contacts the battery cell array 160. The compression springs 200 may be further configured such that the force against the thermal plate 174 substantially does not exert a force against the battery cell array 160 or move the battery cell array 160. This type of a configuration may be desirable since in this example the support structure 162 is configured to support the battery cell array 160 instead of the thermal plate 174.

Figure 6A:
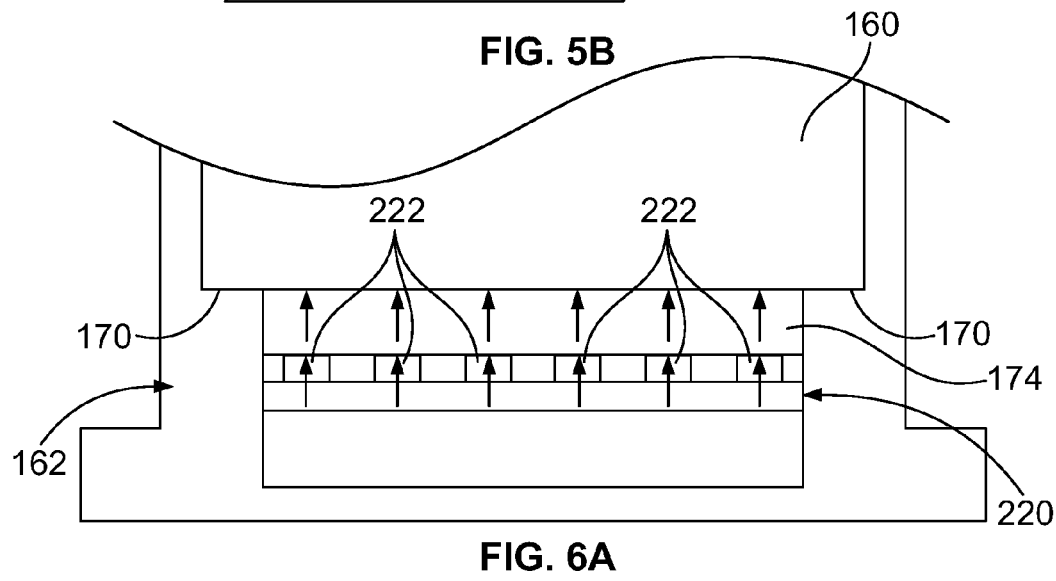
FIG. 6A is a front view, in cross-section, of a battery cell array, a thermal plate, another spring component, and a battery cell array support structure.
Figure 6B:
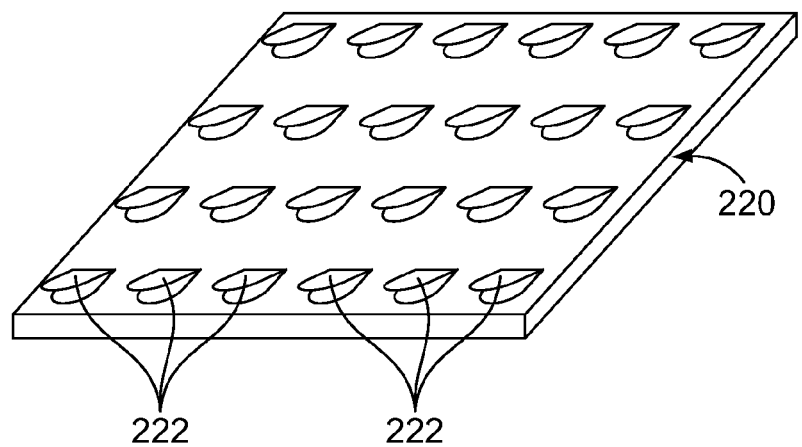
FIG. 6B is a perspective view of the spring component from FIG. 6A.

FIGS. 6A and 6B show another example of the spring component 178 which may include a body 220 defining a plurality of tabs 222. The tabs 222 may extend outward from a plane defined by the body 220. Characteristics of a material used for the tabs 222 may assist in strengthening the tabs 222 such that a force is exerted against the thermal plate 174 and the thermal plate 174 contacts the battery cell array 160. For example, the tabs may be made of steel or a glass filled polypropylene which may be biased to push the thermal plate 174 against the battery cell array 160 with a force which may be greater than the gravitational force of the thermal plate 174, and in certain circumstances several times greater than the gravitational force of the thermal plate 174 to counteract any downward acceleration of the thermal plate 174 which may occur during operational durability bouncing and jouncing movements. The tabs 222 may be spaced apart, across, and throughout the body 220 and/or may be tightly spaced across and throughout the body 220. It is contemplated that multiple arrangements of the tabs 222 are available which may accommodate, for example, different traction battery packaging constraints and different load requirements for different types of battery cell arrays. In this example, the tabs 222 may be configured to exert a force against the thermal plate 174 such that the thermal plate 174 contacts the battery cell array 160. The exerted force by the tabs 222 may be equal to or greater than a weight of the thermal plate 174. This type of a configuration may be desirable since in this example the support structure 162 is configured to support the battery cell array 160 instead of the thermal plate 174.

Figure 7A:
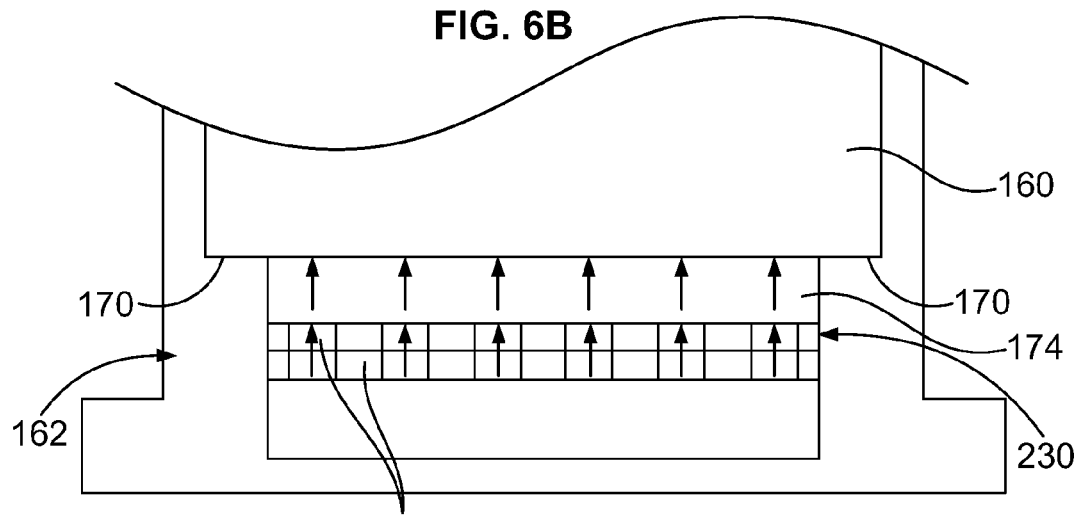
FIG. 7A is a front view, in cross-section, of a battery cell array, a thermal plate, yet another spring component, and a battery cell array support structure.
Figure 7B:
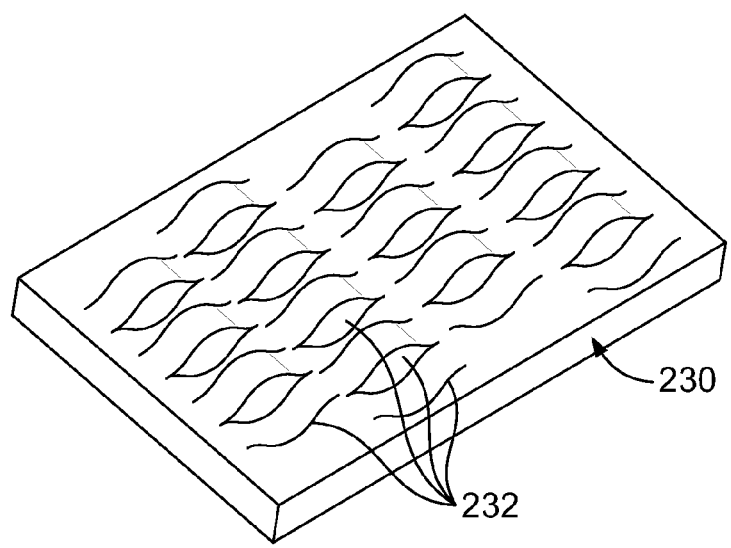
FIG. 7B is a perspective view of the spring component from FIG. 7A.

FIGS. 7A and 7B show an example of the spring component 178 which may include a body 230 defining a crimped sheet of material such as a series of individual cantilevered tabs 232. The tabs 232 may extend upward and/or downward. The tabs 232 may define a series of leaf spring forms in a wave like fashion as shown in FIG. 7B. The spring component 178 may be composed of one continuous component, such as a stamped steel plate or molded plastic springs, or may consist of multiple components. It is contemplated that multiple arrangements of the tabs 232 are available which may accommodate, for example, different traction battery packaging constraints and different load requirements for different types of battery cell arrays. In this example, the tabs 232 may be configured to exert a force against the thermal plate 174 such that the thermal plate 174 contacts the battery cell array 160. The exerted force by the tabs 232 may be equal to or greater than a weight of the thermal plate 174. In another example, the support structure 162 may be formed with a convex surface underneath the battery cell array 160 which may tend to push the thermal plate 174 into the battery cell array 160. As such, the spring component 178 may be integrated directly into the support structure 162.

As described above, the spring component 178 may have multiple embodiments and be disposed adjacent to the thermal plate 174 and within a cavity defined by the support structure 162 and the battery cell array 160. The spring component 178 may be configured to exert a force against the thermal plate 174 such that the thermal plate 174 contacts the bottom surface 164 of the battery cell array 160 and may transfer heat therebetween. The force exerted by the spring component 178 may be configured to equal a force value according to a desired implementation with various types of traction battery assemblies and various types of packaging constraints for the traction battery assemblies.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery thermal plate assembly comprising:
   a structure having edge portions defining a cavity and supporting a battery cell array;
   a thermal plate disposed adjacent the array and within the cavity; and
   a body arranged with the edge portions to align the plate and array and defining a plurality of tabs each extending therefrom and having an end not secured to the plate to exert a force against the plate.

2. The assembly of claim 1, wherein the thermal plate disposed within the cavity is below the array.

3. The assembly of claim 1, wherein the body is a crimped sheet of material and the plurality of tabs extend above and below a plane defined by the body in a wave like fashion.

4. The assembly of claim 1, wherein the body is a spring assembly comprising a base portion and an upper portion, and wherein the tabs are compression springs.

5. The assembly of claim 1, wherein the body is a spring assembly configured to exert a force toward the thermal plate greater than a weight of the thermal plate.

6. The assembly of claim 1, wherein the structure further defines a pair of retainer segments extending below a portion of a bottom surface of the battery cell array such that the retainer segments receive a load of the battery cell array.

7. A vehicle comprising:
   a battery array defining at least one surface;
   a structure located proximate to the array such that the array and structure define a cavity and edge portions adjacent to the array;
   a thermal plate configured for thermal communication with the array and extending throughout the cavity and along the surface; and
   a spring component arranged with the edge portions to align the thermal plate and array and having elements extending therefrom configured to exert an upward force on the thermal plate without being secured thereto and such that the thermal plate contacts the at least one surface.

8. The vehicle of claim 7, wherein the at least one surface is a bottom surface of the array and the structure is a support structure including a pair of retainer segments extending below a portion of the bottom surface such that the retainer segments receive a load of the array.

9. The vehicle of claim 8, where the thermal plate extending throughout the cavity is below the array.

10. The vehicle of claim 7, wherein the spring component includes a body defining a plurality of tabs extending outward from a plane defined by the body and configured to exert a force equal to or greater than a weight of the thermal plate.

11. The vehicle of claim 7, wherein the spring component includes a crimped sheet of material defining tabs extending upward and downward in a wave like fashion and wherein the tabs are configured to exert a force against the thermal plate.

12. The vehicle of claim 7, wherein the spring component includes a base portion and an upper portion configured to support a plurality of compression springs therebetween, and wherein the compression springs are configured to exert a force equal to or greater than a weight of the thermal plate.

13. The vehicle of claim 7, wherein the spring component is configured to exert a force against the thermal plate greater than a force generated by a weight of the thermal plate, and wherein the exerted force does not move the array.

14. The vehicle of claim 7, wherein the spring component is configured to exert a force against the thermal plate equal to a force generated by a weight of the thermal plate and a weight of the array.

15. A traction battery assembly comprising:
   a battery cell array defining a bottom surface;
   a support structure including one or more retainer segments configured to receive a load generated by the array and edge portions arranged with the array such that the array and support structure define a cavity therebetween;
   a thermal plate disposed within the cavity and defining channels therein configured to direct thermal fluid therethrough; and
   a spring component arranged with the retainer segments to align the array and thermal plate, disposed within the cavity below the thermal plate, and having elements extending therefrom and configured to apply a force to the thermal plate without being secured thereto such that the thermal plate contacts the bottom surface to promote heat transfer.

16. The assembly of claim 15, wherein the spring component includes a body defining a plurality of tabs extending upward of a plane defined by the body and configured to exert a force equal to or greater than a weight of the thermal plate.

17. The assembly of claim 15, wherein the spring component includes a body defining tabs extending upward and downward in a wave like fashion and wherein the tabs are configured to exert a force against the thermal plate.

18. The assembly of claim 15, wherein the spring component includes a base portion and an upper portion configured to support a plurality of compression springs therebetween, and wherein the compression springs are configured to exert a force equal to or greater than a weight of the thermal plate.

* * * * *